US005166709A

United States Patent [19]

Kubelik

[11] Patent Number: 5,166,709

[45] Date of Patent: Nov. 24, 1992

[54] ELECTRON DC PRINTER

[75] Inventor: Igor Kubelik, Mississauga, Canada

[73] Assignee: Delphax Systems, Canton, Mass.

[21] Appl. No.: 651,313

[22] Filed: Feb. 6, 1991

[51] Int. Cl.[5] .......... G01D 15/06

[52] U.S. Cl. .......... 346/155; 346/158

[58] Field of Search .......... 346/159, 158, 155

[56] References Cited

U.S. PATENT DOCUMENTS

| | | | |
|---|---|---|---|
| 3,358,289 | 12/1967 | Lee | 346/159 |
| 3,611,418 | 10/1971 | Uno et al. | 346/158 |
| 3,765,027 | 10/1973 | Bresnick | 346/159 |
| 4,259,678 | 3/1981 | van Gorkom et al. . | |
| 4,558,334 | 12/1985 | Fotland | 346/159 |
| 4,810,934 | 3/1989 | Shimoda et al. . | |
| 4,833,507 | 5/1989 | Shimizu et al. . | |
| 4,858,062 | 8/1989 | Hayakawa et al. | 346/159 |
| 4,899,186 | 2/1990 | Walcott | 346/159 |
| 4,904,895 | 2/1990 | Tsukamoto et al. . | |
| 4,954,744 | 9/1990 | Suzuki et al. . | |

OTHER PUBLICATIONS

C. A. Spindt et al., "Physical Properties Of Thin-Film Field Emission Cathodes With Molybdenum Cones", J. of Appl. Phy 47.12, 1976, pp. 5248-5261.

J. A. Dayton, Jr. et al., "Ultra Small Electron Beam Amplifiers" IEDM-86 pp. 780-783.

"Cold Cathodes-Vacuum Microelectronics Enter The Flat-Display Race" Scientific American, 1990, pp. 122-123.

*Primary Examiner*—George H. Miller, Jr.

*Attorney, Agent, or Firm*—Lahive & Cockfield

[57] ABSTRACT

A DC operated printhead emits electrons by field emission at each crossing of first and second electrodes. Plural small electrode sets consisting of a cathode emitting cone and an anode aperture form a gap which less than the electron mean free path in an ambient atmosphere, and the sets are preferably closely spaced to form a substantially collimated beam. A third electrode preferably accelerates and cleans up the beam. Different gases may be used to increase emission or transport efficiency, and enhance electrode lifetime.

8 Claims, 6 Drawing Sheets

FIG. 1
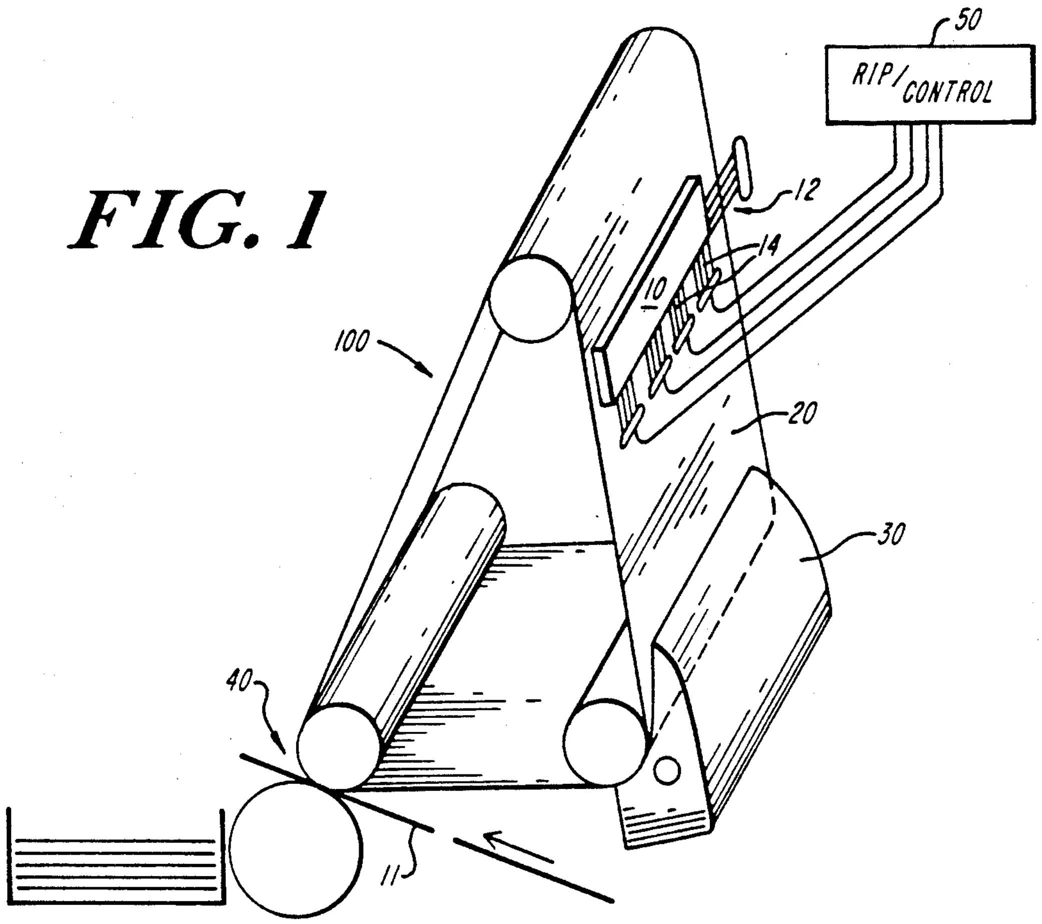
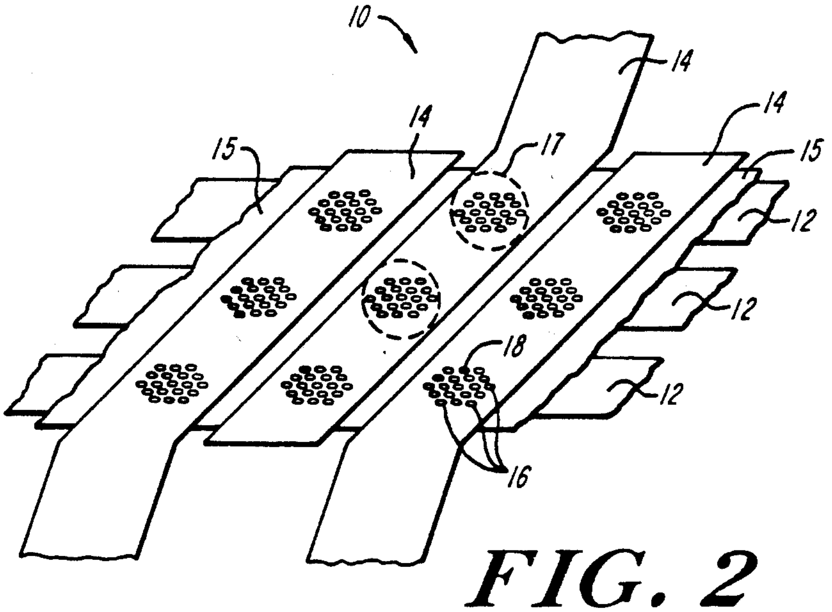
FIG. 2

ELECTRON DC PRINTER

BACKGROUND OF THE INVENTION

The present invention relates to electrographic printing apparatus, and more particularly to such apparatus for the printing of images by first forming an electrostatic latent image on an imaging member, such as a belt or drum, and then toning the latent image to develop a toned image which may be transferred to a recording sheet to form a finished print. In particular it relates to such systems wherein the electrostatic latent image is formed by depositing a pattern of charge on the imaging member.

In one class of prior art constructions, it is known to deposit a pointwise pattern of charge by actuating selective pins of an electrostatic pin array. Other mechanisms of charge deposition now commonly used include the deposition of a pointwise charge pattern by "ionographic" print cartridges. These systems are printers having printheads wherein a matrix of sets of electrodes are provided, each set constituting an "ion generator" which forms and accelerates charged particles—ions, electrons or both—toward the imaging member. Descriptions of systems of this type may be found in U.S. Pat. Nos. 4,155,093; 4,628,227 and many others. Such constructions create harsh environmental conditions as a result of the glow discharges which are the source of the charge carriers, and these conditions adversely affect the lifetime and performance of key components.

In the past, it has been proposed to utilize electrons for printing by employing some conventional electron-generating structure, such as a cathode ray tube, to form the desired latent image; more recently there have been a number of proposals to employ microlithographically-made electron sources for charge pattern formation. As representative of this class of electron sources, reference is made to U.S. Pat. Nos. 4,259,678; 4,858,062; 4,810,934; and 4,904,895. Such sources might, for example, be used to write a pattern on a cathode ray tube (CRT) or on a liquid crystal display (LCD). Typically, in proposed constructions of this type, the electron source is operated in a vacuum, and to be of use the electrons must generally be accelerated to an energy in the tens of kilovolts to actuate the phosphors of a CRT screen or to pass through an electron-transmissive face plate or window. The provision of a vacuum region or of electron-transmissive windows in an electrographic imaging apparatus, however, may raise problems of cost, complexity, reliability or even safety.

Perhaps for these reasons, applicant is unaware of commercial print systems based on electron writing sources, except for such electron effects as occur in operating the aforesaid ionographic printing systems at high voltages to deposit negative charge carriers.

SUMMARY OF THE INVENTION

In accordance with the present invention, a printer includes an imaging member and an array of charge deposition structures which deposit an electrostatic latent image on the imaging member. Each charge deposition structure includes one or more first electrodes which are closely spaced to corresponding second electrodes and are energized to eject electrons by field emission while operating in an voltage range lying below the Paschen curve. The entire array is biased with respect to the imaging member, so that electrons emitted by the array are accelerated toward the imaging member, and a raster image processor selectively actuates the charge deposition structures so that electrons are emitted at predetermined ones of the deposition structures in an order to deposit a desired latent image on the imaging member.

Preferably, each charge deposition structure comprises plural closely adjacent sets of first and second electrodes, all the first electrodes being connected in common, and all of the second electrodes being connected in common, arranged so that mutual space charge repulsion efficiently collimates the several resultant electron beams to produce a single charge dot.

The device operates in a gaseous atmosphere, the gas preferably being a non-electron-attaching gas or gas mixture selected to enhance transport of emitted electrons to the imaging member. The gas may further be of a type which, when absorbed onto at least the first electrodes, lowers the work function thereof. Use of a non-electron-attaching gas such as nitrogen further inhibits ion formation, leading to enhanced print cartridge lifetime.

BRIEF DESCRIPTION OF THE DRAWINGS

These and other desirable features of the invention will be understood from the following description of representative embodiments and from the claims appended hereto, taken together with the drawings, wherein FIG. 1 shows a printer in accordance with the present invention;

FIG. 2 shows a perspective view of a detail of a printhead in the system of FIG. 1;

DETAILED DESCRIPTION

Figure 2A:
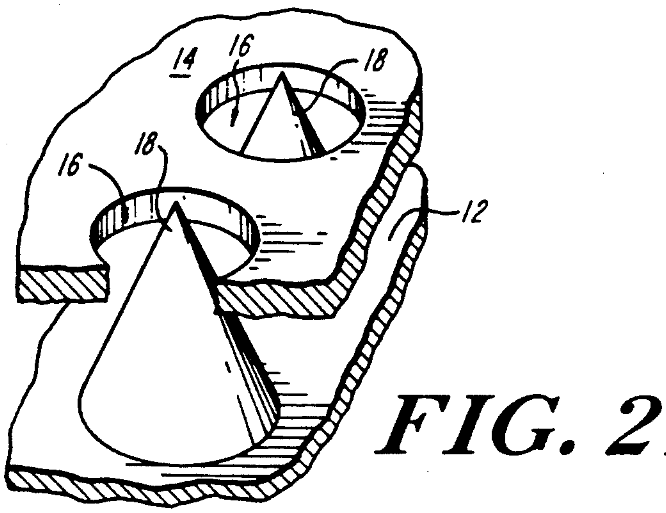
FIG. 2A shows an enlarged detail of the charge emitters in FIG. 2.

A system 100 according to the present invention includes an electrode array printhead 10 which is arranged in a strip extending across the direction of motion of a dielectric imaging member 20, which may be a reciprocating plate, a rotating drum, or, as illustrated, a belt. The imaging member 20, after receiving a latent charge image from the electrode array printhead 10, moves past a developing station 30 which applies toner to the latent image, then moves past a transfer nip 40 where the developed image is transferred to a sheet 11, to be fused and form a print. A raster image processor/printhead controller 50 controls the actuation of the electrode array printhead 10 to form a desired image.

As illustrated, printhead 10 has a first set of actuation lines 12 which constitute or connect to cathodes, and running generally across the width direction of imaging member 20, and a second set of actuation lines 14 which constitute anodic electrodes oriented transversely to lines 12, each crossing of the two different types of lines 12, 14 determining a charging site opposed to imaging member 20. The general geometry for laying out a matrix array of electrodes and of operating a printhead in an appropriate sequence to form a desired latent image has been well established for RF-actuated ionographic printheads and is widely known in the field, so it will not be further discussed here. The individual electrode structures for forming each point image of the array in accordance with the present invention, however, differ from those of conventional printheads.

FIG. 2 shows in magnified exploded detail one basic electrode structure contemplated for the electron emission array of a printhead 10 according to the present invention. The first set of actuation lines 12 are separated by an insulating layer or film 15 from the transverse set of electrodes 14, the crossing of any two electrodes 12, 14 defining a dot generating locus 17, of which several such dot loci are identified by dashed perimeter line.

The structure of each dot generating locus 17 consists of a plurality of separated apertures 16 formed in an anode electrode 14, and a corresponding plurality of conductive spikes or cones 18 best seen in FIG. 2A, each spike being conductively attached to the underlying cathode electrode 12 and extending so that its tip is at or close to the plane of electrode 14 and centered in the aperture 16. Apertures 16 have a diameter under approximately one or two micrometers, and the tip of each spike 18 extends to within approximately one half micrometer of the wall of its aperture. This creates a gap with a sufficiently high electric field that electrons are spontaneously emitted from the tip of the spike and pass outwardly through the anode aperture. For this purpose, an actuating voltage of approximately 100–200 volts is applied. The apertures 16 and spikes 18 may be formed as a regular pattern on centers spaced between approximately 5–50 micrometers apart, the entire set of apertures that constitutes one charge dot occupying a space generally no more than one hundred micrometers in diameter, and preferably less.

FIG. 2A is an enlarged perspective view showing details of the electrode emission structures in one embodiment of the device of FIG. 2, with the support or spacer layer 15 omitted to emphasize the functional elements of the printhead. The view illustrates the spikes 18 rising from electrode 12 in apertures 16. Due to the particular fabrication methods employed for this embodiment, as discussed further below, each cone or spike 18 becomes progressively steeper with height, to form a needle-like spire in the opening. In other embodiments, the central cone may have a straight or rounded profile.

Figure 3A:
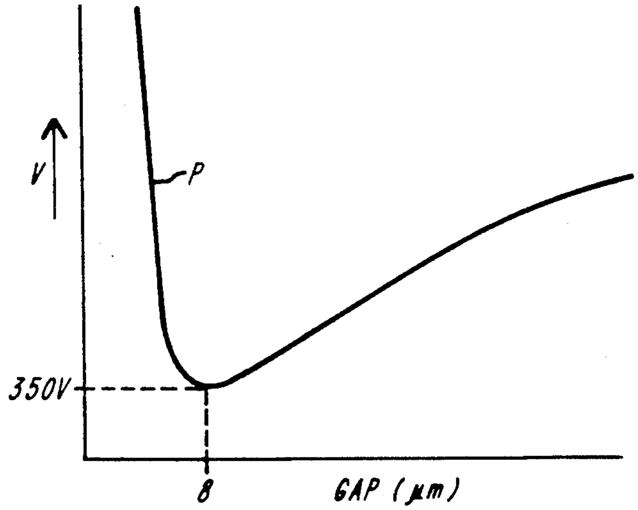
FIGS. 3A, 3B and FIGS. 4A, 4B, 4C and 4D illustrate field characteristics.
Figure 3B:
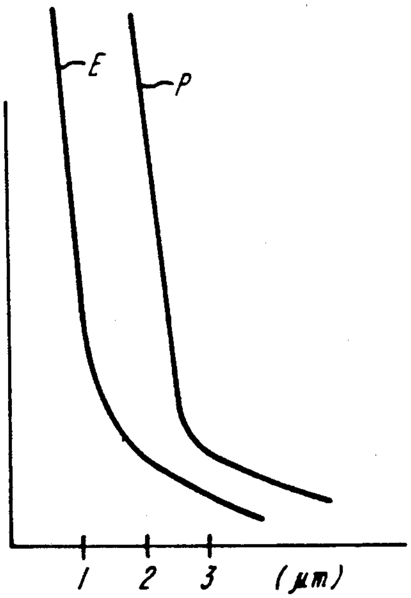

According to a principal aspect of the invention, the dimensions and operating voltages of the electrode structures are selected such that field effect emission of electrons is induced at the tip of each spike, at an applied voltage which lies below the Paschen breakdown threshhold of the medium in which the electrode gap is operated. This is illustrated in FIGS. 3A, 3B which show the Paschen curve P for spark gaps in air under standard conditions (FIG. 3A) and a schematic superposition of curves for the corresponding maximum E field strength and Paschen breakdown field strength for a particular electrode structure with a spike of 500 Angstrom tip radius centered in an anode opening of 1.5 μ diameter (FIG. 3B). Suitable field strengths for electron emission at these dimensions have been achieved at a DC electrode voltage below several hundred volts.

According to another principal aspect of the invention, each dot-forming locus is composed of plural adjacent electron emitters, placed sufficiently closely together that the additive effect of the fields from adjacent apertures forms electric field lines that are relatively flat, and such that multiple parallel beams therefore are more efficiently directed substantially along the normal to the anode plane and are non-diverging in the dot center region. For example, apertures of 1.0 micrometers may be placed under approximately ten, and preferably under five, micrometers apart to form an extended array of electron emitters which collectively constitute a beam for depositing one charge dot.

Figure 4A:
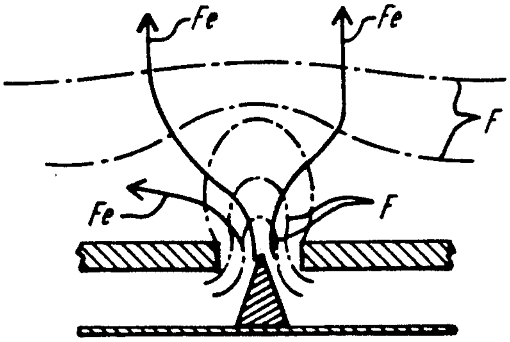
Figure 4B:
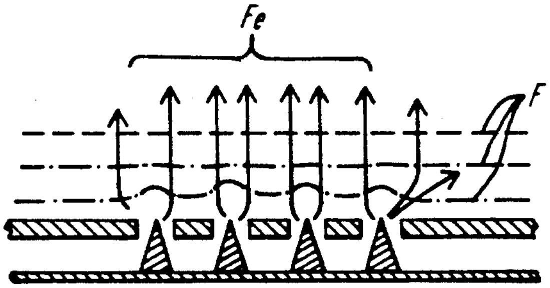
Figure 4C:
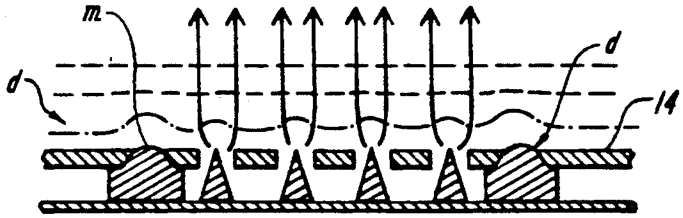
Figure 4D:
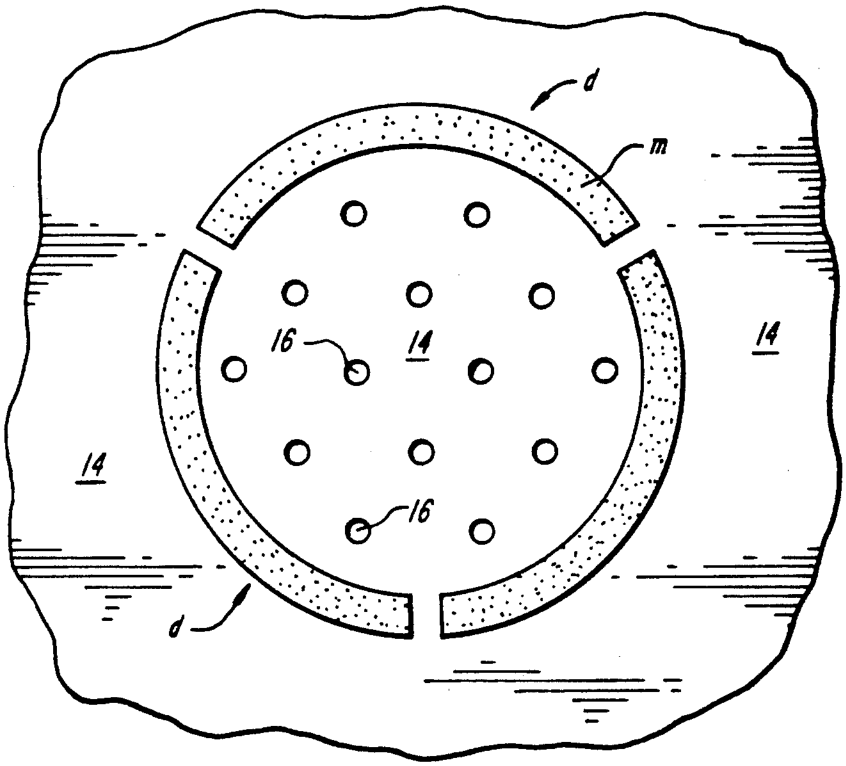

To illustrate this effect, FIGS. 4A, 4B show on a generalized scale and in section, the field lines F and the electron emission trajectories $F_e$ for a single emitter (FIG. 4A) and for a closely spaced set of emitters (FIG. 4B). With multiple emitters, the emission trajectories in the central region are substantially straight, although there remain divergent trajectories at the boundary of the emitter array. FIG. 4C shows a further embodiment, in which a plurality of "dummy" holes "d" are positioned at edges of the emitter array and are filled with a dielectric material "m" which charges to create a field effect to compensate these divergent trajectories and shape the beam. FIG. 4D is a top view of one such compensated emitter array. The dielectric-filled beam shaping electrode openings "d" form arcuate regions about the periphery of the array.

Figure 5:
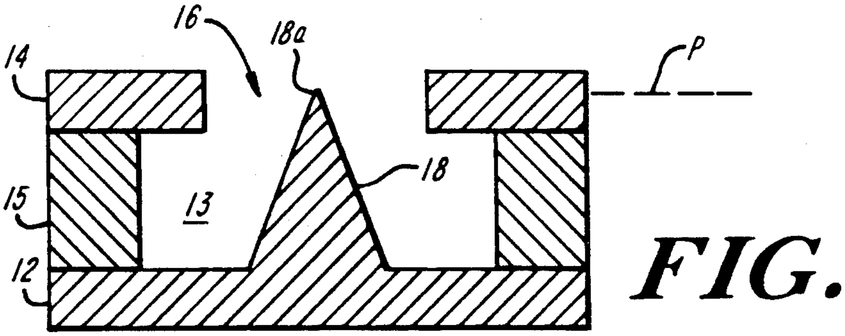
FIG. 5 shows a sectional view, partly schematic, of one electron emission structure in the printhead of FIG. 2.

Turning now to FIG. 5, there is shown a cross-sectional view in a plane normal to the planes of electrodes 12 and 14, through a single electron emission aperture 16 and corresponding spike 18, the layout and structure of each such pair in the set constituting one charge dot being similar. As shown, electrode 12, which is conductive, is overlaid with an insulating layer 15 which serves as a distance-defining support for overlying electrodes. When layer 12 is formed of silicon, layer 15 may, for example, be a thermally-grown oxide layer. Anode layer 14, also conductive, is formed over layer 15, and its aperture 16 is formed and a corresponding cavity or opening 13 is etched therethrough into the insulating layer 15. Aperture 16 is substantially circular, and since the cavity 13 is preferably formed by etching through the opening 16, the cavity 13 in the insulation layer is of roughly similar shape, but larger. Rather than a circular aperture, each opening 16 may also be formed in another shape by substitution of different pattern etch processes, so long as the gap remains less than the electron mean free path.

Continuing with FIG. 5, spike 18 is deposited through the opening 16, and is formed of a conductive, and corrosion—and erosion-resistant material such as molybdenum, positioned such that its tip 18*a* rises substantially to the plane "P" of electrode 14.

Representative materials and dimensions of the above structures are as follows: electrode 12—highly conducting (0.01 Ohm/cm.) silicon; insulator 15—(1.5) μm oxide layer formed by standard oxidation techniques; electrode 14=(0.4) μm thick layer of molybdenum formed, for example, by electron beam evaporation; spike 18—(1.7) μm high cone of molybdenum deposited through aperture 16 by electron beam evaporation at normal incidence from a small source.

For details on the construction and operating characteristics of individual thin-film field emission cathode structures or arrays, reference is made to the research of C. A. Spindt and co-workers, as reported, for example, in the Journal of Applied Physics 39 p. 3504, June 1968, and in Vol. 47 No. 12 December 1976 p. 5248. These papers provide practical teachings for the formation of release layers, appropriate etches and useful materials to fabricate planar or thin film arrays of such field emission cathodes. It will be understood that these methods may be varied to substitute current advances in microlithography and the fabrication of thin film elements, such as focused ion beam (FIB) etching or deposition of materials, and excimer laser processing to form pattern masks or to directly deposit, anneal or etch patterns and materials. For purposes of completeness, a representative sequence of processing steps suitable for forming the structures of FIGS. 2, 2A and 5 is illustrated in FIGS. 7A–7D.

The field emission cathode structure of FIG. 5 consists basically of a conductor/insulator/conductor sandwich. The top conductor or gate film has holes of from 1.0 to 3.0 μm diameter in it, through which a cavity can be etched in the insulator. This cavity undercuts the gate 14 and uncovers the bare substrate conductor 12. A metal cone whose base is attached to the substrate and whose tip is close to the plane of the gate film is then formed in the cavity.

Heavily doped silicon is preferred as the substrate, since silicon dioxide can be grown on its surface to a thickness of around one micrometer with excellent adherence, no porosity, and a high-field breakdown strength. A film of molybdenum about 0.4 μm thick is vacuum-deposited on the silicon dioxide to provide the gate electrode. The cone height, tip radius, and gate aperture are variables of the fabrication technique that offer some control over the current-voltage characteristics of the completed device, as discussed further below.

Representative details of fabrication are as follows:

(a) Obtain standard five centimeter diameter silicon wafers, 0.75 mm thick, of highly conducting (0.01 Ω/cm) silicon, as are used for semiconductor fabrication.

(b) Oxidize the wafers to the desired thickness—about 1.5 μm—using standard oxidation techniques.

(c) Cut the wafers into squares of a size suitable for handling by scribing and breaking.

(d) Coat the oxide with a uniform layer (0.4 μm thick) of molybdenum. Electron beam evaporation is believed to be more convenient for this purpose than sputtering.

(e) Coat the squares of the molybdenum side with an electron-sensitive resist, e.g., PMM (poly-methylmethacrylate), to a thickness of about 1 μm, using standard spinning methods.

(f) Expose the resist-coated surface in vacuum to a pattern of electron beams focused to form an array of spots in the desired configuration for a multi-emitter charge dot array. Suitable electron projection techniques have been described by Westerberg and others; the details of these techniques are omitted here. The exposed spots are about one to two micrometers in diameter.

(g) Remove the PMM that has been exposed to electrons, by dissolving these areas in isopropyl alcohol, thereby exposing the underlying molybdenum layer 14. Then, selectively etch the molybdenum through to the silicon dioxide layer.

(h) Remove the remaining PMM resist. Then, etch the silicon dioxide down to the silicon base with a hydrofluoric acid solution. At this point, the structure takes the form illustrated in FIG. 7A. With this etch, the molybdenum layer is undercut by removal of silicon dioxide, since the hydrofluoric acid does not attack molybdenum.

Figure 7A:
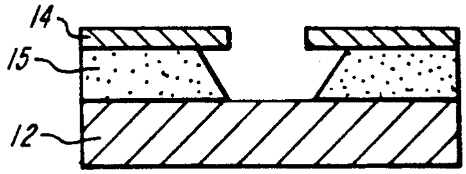
FIGS. 7A-7D show steps in a representative fabrication process.
Figure 7B:
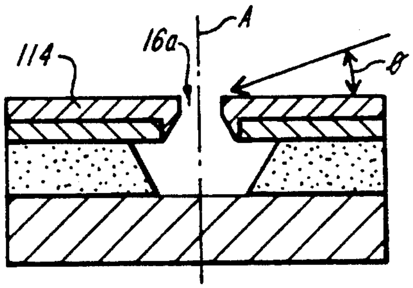
Figure 7C:
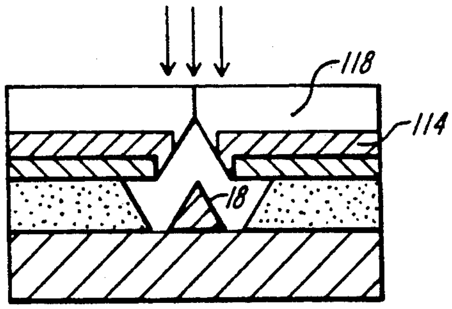
Figure 7D:
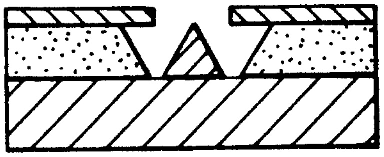

(i) Mount the substrate in a vacuum deposition system and rotate the substrate about an axis "A" perpendicular to its surface while depositing a parting layer of aluminum 114 at grazing incidence. In this way the size of the holes 16 can be decreased to any desired diameter 16*a* (FIG. 7B).

(j) Deposit molybdenum through the partially closed holes 16*a* by electron beam evaporation from a small source at normal incidence. The size of the hole continues to decrease because of condensation of molybdenum on its periphery. A cone 18 grows inside the cavity, as the molybdenum vapor condenses, on a progressively smaller area, limited by the decreasing size of the aperture. That is, a layer 118 of molybdenum builds up over the release layer 114 and gradually closes off the opening 16. A point is formed on cone 18 as the aperture closes. As will be appreciated by those skilled in micropattern formation and deposition processes, it is possible to control the cone height, angle, and tip radius by appropriate choice of the starting aperture size, the thickness of oxide layer, and the distance of the evaporation source from the substrate.

(k) Dissolve the parting layer of aluminum 114, releasing the molybdenum film deposited on top during the cone formation step. After a thorough cleaning, the cathode is ready for mounting in and actuation as a printhead structure.

Using such fabrication steps, others have successfully fabricated arrays of 1, 100 an 5000 emitting cones, and have performed tests on the emission characteristics of such cathode arrays in a vacuum. Applicant separately realized the feasibility of using such emitters to form latent images for toning and printing, and describes herein effective structures for achieving this result.

In addition to the structures discussed above, the present invention contemplates that the conductive electrode lines 12 may be formed in the silicon substrate, or in an epitaxially-grown layer formed on the substrate, by suitable patterned doping steps to isolate plural parallel conductive areas constituting the electrode lines 12 (FIGS. 1 and 2). As incorporated in an actual printhead construction, the major body of the printhead may provide or consist of simply a support structure or frame with suitable electrical vias or connectors, and the above-described cathode structures may be fabricated as a plurality of separate chips having a size of roughly one by two centimeters, which each fit onto and are electrically interconnected with the printhead body.

Figure 6:
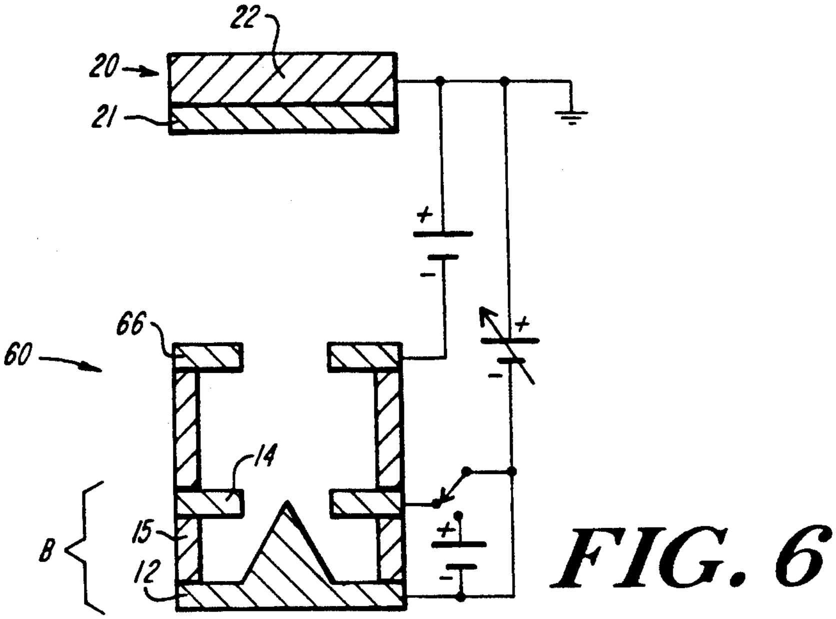
FIG. 6 shows a view, similar to that of FIG. 5, of another embodiment of an electron emission structure.

FIG. 6 illustrates an alternative electrode structure 60 for each field emission cathode of an array of such structures constituting one charge dot generator. In this embodiment, the imaging member 20 is illustrated schematically having a conductive backplane layer 22 and a charge-receiving dielectric surface layer 21. An accelerator/screen electrode 66 is located between the basic field emission structure "B" as described above, and the imaging member 20. Electrode 66 is maintained negative with respect to member 20 and positive with respect to cathode 12, and thus serves to shield the small field emission cathode from the relatively high potential difference in the printhead/imaging member gap, while accelerating emitted electrons toward the member 20. Electrode 66 thus serves the functions performed by the screen electrodes of conventional printheads. In this regard, the electrode may be formed with a large aperture that lies over plural emitters, and may be fabricated of a perforated sheet which is separately attached over the underlying generator array.

As noted above, the invention contemplates a printhead structure which deposits electrons on an imaging member and wherein individual electron emitters operate by field effect emission in a gaseous environment with an applied voltage lying below the Paschen curve. In such a structure, preferably each charge dot is formed by a plurality of between a few and a few hundred cathode emission structures formed at a common electrode crossing. The entire assembly is operated in an ambient atmosphere maintained at a pressure comparable to normal atmospheric pressure. The electrode gap between each cathode cone 18 and the corresponding anode 14 is dimensioned to be less than the electron mean free path, thus ensuring that ionization does not occur. The cone tip is formed with a suitably small radius, e.g., under about five hundred Angstroms, to constitute a reliable high-field intensity emission structure.

Figure 8:
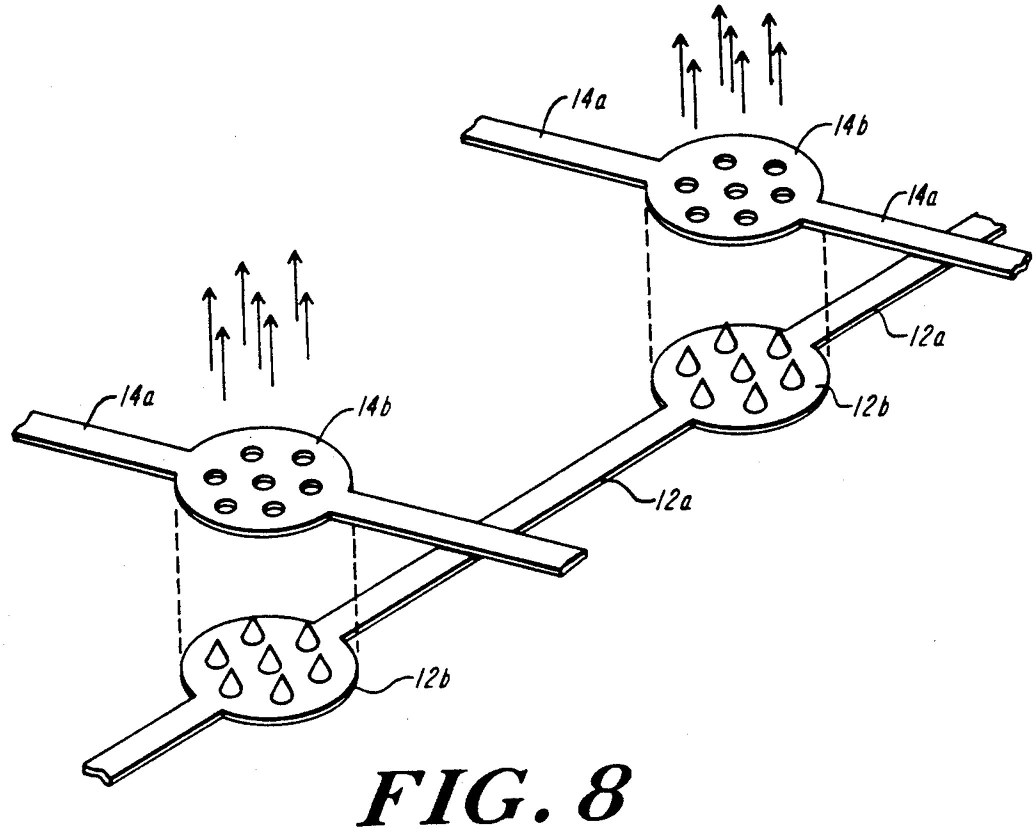
FIG. 8 shows an alternative electrode shape.

Preferably, the electrodes 12, 14 are patterned to have relatively little surface area in the region between their crossing points to that capacitive effects are minimized. FIG. 8 illustrates one contemplated form of such patterned electrodes. As shown, each electrode consists of a string of conductive connecting portions (12*a* or 14*a*) between successive active electrode portions (12*b* or 14*b*) on which the actual cathode/anode emission structures are fabricated. Tailoring of the planar electrode shapes in this manner lowers the intrinsic capacitance of the print head, allowing faster switching times and more efficient generation of charge dots. This allows full advantage to be made of the higher multiplexing and switching speeds attainable with switched electrodes operating at the 100–200 volt DC range of the above-described printheads, and is expected to allow the use of more economical control and actuation circuitry than that used in current ionographic printers.

As described above, each charge dot, which in a typical electrographic printer has a diameter not much greater than 0.05 to 0.15 millimeters to provide reasonable resolution, is illustrated as being formed and deposited by plural field emission cathodes. This multiplicity does not follow from necessity, since even single cathode cone as described above may emit a sufficient electron current to deposit a five picoCoulomb or larger charge dot in the five microsecond time interval characteristically taken to deposit one charge dot in a 300 dpi ionographic printer. Rather, applicant has found that employing plural separate charge emitters to print a single dot can diminish the statistical variation in occurrence of charge emission events and thus result in a more uniform level of delivered charge. Preferably, the number of emitters at each charge dot site is above ten or more, for example, an array of nineteen as shown in FIG. 2, or even an array of one hundred or more, although dots of a single, or as few as five to nine emitters are also contemplated. In general, the larger the number of individual emitters in one dot structure, the lower the variation in total delivered charge.

The multiplication of charge sources in this manner also results in extremely high charging current capability, allowing the "ON" time of each dot to be reduced by an order of magnitude or more. In practical terms, this results in higher speed printing, with a ten-fold or greater increase attainable in the number of sheets per minute printed. In this regard, the skeletal electrode bodies as shown in FIG. 8 further allow faster switching times necessary to attain higher print speed.

In addition to the foregoing aspects, applicant's invention contemplates operation with relatively low acceleration potential applied between the printhead and the print imaging member, or with the printhead spaced relatively closely to the imaging member. Thus, while applicant has detected electron transport across distances of 1.5 or more millimeters in air, a spacing of (0.1) to (0.2) millimeters and an electrode-to-drum acceleration potential of approximately 700 volts or below are considered adequate.

In order to assure the absence of reactive species which might quickly erode the cathode tip, applicant further contemplates first baking the structure to drive off adsorbed gases, and then in use, bathing the printhead area in a gas such as nitrogen, to which electrons will not attach. Operation in such a gas environment prevents negative ion formation over the short distances contemplated for an electron printing apparatus of otherwise conventional type. It has further been reported that adsorption of nitrogen by molybdenum can lower the work function at the metal surface. This effect is expected to enhance electron emission efficiency and allow operation of the field emission cathodes with even lower applied voltages. Other suitable gases which lower the field emission voltage, prevent negative ion formation, or both, may also be used.

It will be understood that the illustrative fabrication process described in relation to FIGS. 7A–7D may be varied by employing other techniques of submicron semiconductor lithography. For example, rather than the electron beam-hardened PMMA resist steps described at (e)–(h) above, other resists, exposure conditions and etching processes may be used. Similarly, direct photolytic decomposition or hardening by excimer laser, e-beam, x-ray or ion beam exposure may be used for various steps of resist exposure, material deposition or material removal, to form the electrode patterns and structures.

This completes a description of representative embodiments of the invention, which are to be understood as illustrative and not limiting in their scope. Armed with the teachings of this disclosure of embodiments and their principles of operation, variations and modifications will occur to those skilled in the art, and such variations and modifications are considered to lie within the scope of the invention and its range of equivalents, as defined by the claims appended hereto.

What is claimed is:

1. A printer including a dielectric imaging member and an array of charge deposition structures which deposit a latent image on the imaging member, each charge deposition structure including at least one first electrode each first electrode being spaced from a corresponding second electrode and characterized in that the array operates in a gaseous medium substantially at atmospheric pressure and the first and second electrodes form a high field for causing the first electrode to emit electrons by field emission while operating in a voltage range lying below the Paschen curve of said gaseous medium and projecting the electrons to the imaging member therethrough.

2. A printer according to claim 1, wherein a first electrode and corresponding second electrode define a gap less than approximately one electron mean free path in said gaseous medium.

3. A printer according to claim 1, wherein each charge deposition structure deposits a charge dot on the imaging member, and is comprised of a plurality of first electrodes and a plurality of second electrodes operated together to produce said charge dot.

4. A printer according to claim 3, wherein the plurality of first and second electrodes in one charge deposition structure is between approximately five and one hundred fifty.

5. A charge deposition printhead for use in a printing apparatus, such charge deposition printhead comprising a plurality of first electrodes extending in a layer along a first direction a plurality of second electrodes extending along a second direction to define with said plurality of first electrodes an array of crossing points corresponding to charging loci an electrically insulating support between said first and second electrodes at least one conductive cone at each crossing point defined by the first and second electrodes, each such cone extending from a said first electrode in the direction of said electrically insulating support to a corresponding aperture located in said second electrode, the cone and corresponding aperture being dimensioned so that when impressed with a DC driving voltage the cone emits electrons by field emission without ionization of a surrounding ambient atmosphere, and means for maintaining said first and second electrodes at a potential such that emitted electrons are accelerated through the surrounding ambient atmosphere from the cone to deposit corresponding charge dots on a dielectric latent imaging member opposed to the crossing point.

6. The charge deposition printhead of claim 5, wherein each crossing point determined by a first and a second electrode is characterized by a plurality of apertures in the second electrode spaced over a corresponding plurality of conductive cones extending from said first electrode, the cones and apertures defining plural electron emission sources which each emit electrons by field emission effect and together forming a single charge dot.

7. The charge deposition printhead of claim 6, wherein the plurality of apertures are spaced sufficiently closely for self-collimating emitted electrons to form a beam.

8. The charge deposition printhead of claim 6, further comprising a third electrode spaced from the second electrode and maintained at a positive potential with respect to the first electrode, for forming an accelerated beam of electrons emitted at a crossing point.

* * * * *